United States Patent
Hardy et al.

(10) Patent No.: US 8,156,187 B2
(45) Date of Patent: *Apr. 10, 2012

(54) SEARCHING FOR ELECTRONIC MAIL (EMAIL) MESSAGES WITH ATTACHMENTS AT A WIRELESS COMMUNICATION DEVICE

(75) Inventors: Michael Thomas Hardy, Waterloo (CA); Andrew Douglas Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 712 days.

This patent is subject to a terminal disclaimer.

(21) Appl. No.: 11/407,219

(22) Filed: Apr. 20, 2006

(65) Prior Publication Data

US 2007/0250578 A1 Oct. 25, 2007

(51) Int. Cl.
*G06F 15/16* (2006.01)
(52) U.S. Cl. .......................... 709/206; 709/217
(58) Field of Classification Search .................. 709/206, 709/203, 217, 218, 219
See application file for complete search history.

(56) References Cited

U.S. PATENT DOCUMENTS

| | | | |
|---|---|---|---|
| 6,643,651 B1 | 11/2003 | Pearsall | |
| 6,934,738 B1 * | 8/2005 | Furusawa et al. | 709/206 |
| 6,983,310 B2 | 1/2006 | Rouse et al. | |
| 7,080,099 B2 | 7/2006 | Tada et al. | |
| 7,142,883 B2 * | 11/2006 | Rouse et al. | 455/552.1 |
| 7,369,260 B2 * | 5/2008 | Buschi et al. | 358/1.15 |
| 7,370,035 B2 * | 5/2008 | Gross et al. | 1/1 |
| 7,424,510 B2 * | 9/2008 | Gross et al. | 709/203 |
| 7,496,559 B2 * | 2/2009 | Gross et al. | 1/1 |
| 7,567,965 B2 | 7/2009 | Giacobbe et al. | |
| 7,593,991 B2 | 9/2009 | Friedman et al. | |
| 7,725,813 B2 * | 5/2010 | Sylthe et al. | 715/212 |
| 2001/0047389 A1 | 11/2001 | Prahlad et al. | |
| 2002/0161796 A1 * | 10/2002 | Sylthe | 707/500 |
| 2003/0055907 A1 * | 3/2003 | Stiers | 709/206 |
| 2003/0172118 A1 * | 9/2003 | Bilansky et al. | 709/206 |
| 2003/0182378 A1 * | 9/2003 | Treptow et al. | 709/206 |
| 2004/0068545 A1 * | 4/2004 | Daniell et al. | 709/206 |

(Continued)

FOREIGN PATENT DOCUMENTS

EP 1182600 A2 * 2/2002

(Continued)

OTHER PUBLICATIONS

European Search Report. Application No. 06112801.3 Date: Sep. 21, 2006.

(Continued)

*Primary Examiner* — Abdullahi Salad
*Assistant Examiner* — Jimmy H Tran
(74) *Attorney, Agent, or Firm* — Bereskin & Parr LLP/S.E.N.C.R.L., s.r.l.

(57) ABSTRACT

A set of email messages is received at a wireless communication device. Each of the email messages has at least one attachment. For each attachment, an indicator of whether any content of the attachment has been presented at the wireless communication device (e.g. displayed on a display or played on a speaker) is maintained. A subset of the set of email messages is identified and displayed on the basis of the indicators and a user-specified parameter, which may be specified via a graphical user interface. Alternatively, a subset of the set of email messages is identified, wherein each email message of the subset has at least one attachment whose content is presentable at the device.

8 Claims, 5 Drawing Sheets

U.S. PATENT DOCUMENTS

| | | | |
|---|---|---|---|
| 2004/0083271 A1* | 4/2004 | Tosey | 709/207 |
| 2004/0085360 A1 | 5/2004 | Pratt et al. | |
| 2004/0133564 A1* | 7/2004 | Gross et al. | 707/3 |
| 2004/0143564 A1* | 7/2004 | Gross et al. | 707/1 |
| 2004/0143569 A1* | 7/2004 | Gross et al. | 707/3 |
| 2005/0080863 A1* | 4/2005 | Daniell | 709/206 |
| 2005/0102361 A1 | 5/2005 | Winjum et al. | |
| 2005/0144241 A1 | 6/2005 | Stata et al. | |
| 2005/0193068 A1* | 9/2005 | Brown et al. | 709/206 |
| 2005/0257159 A1* | 11/2005 | Keohane et al. | 715/752 |
| 2006/0031340 A1* | 2/2006 | Mathew et al. | 709/206 |
| 2006/0031357 A1 | 2/2006 | Misra et al. | |
| 2006/0069990 A1* | 3/2006 | Yozell-Epstein et al. | 715/527 |
| 2006/0095527 A1 | 5/2006 | Malik | |
| 2006/0101117 A1* | 5/2006 | Yabe et al. | 709/206 |
| 2006/0168543 A1* | 7/2006 | Zaner-Godsey et al. | 715/835 |
| 2006/0218234 A1* | 9/2006 | Deng et al. | 709/206 |
| 2006/0225001 A1* | 10/2006 | Sylthe et al. | 715/864 |
| 2007/0011258 A1* | 1/2007 | Khoo | 709/206 |
| 2007/0061308 A1* | 3/2007 | Hartwell et al. | 707/3 |
| 2007/0233791 A1 | 10/2007 | Sylthe et al. | |
| 2007/0250583 A1 | 10/2007 | Hardy et al. | |
| 2008/0005247 A9* | 1/2008 | Khoo | 709/206 |
| 2008/0010350 A1 | 1/2008 | Chen et al. | |
| 2008/0091787 A1* | 4/2008 | Wolfe | 709/206 |
| 2009/0100073 A1 | 4/2009 | Dargahi et al. | |
| 2010/0287467 A1* | 11/2010 | Sylthe et al. | 715/273 |

FOREIGN PATENT DOCUMENTS

| | | |
|---|---|---|
| EP | 1847949 | 12/2009 |

OTHER PUBLICATIONS

European Examination Report. Application No. 06112801.3. Dated: Feb. 7, 2008.

European Examination Report. Application No. 06112801.3. Dated: Jul. 11, 2007.

Co-pending U.S. Appl. No. 11/554,940, "System, Method, and User Interface for Searching for Messages with Attachments on a Mobile Device", Filed Oct. 31, 2006.

United States Office Action. Co-pending U.S. Appl. No. 11/554,940. Dated: Apr. 13, 2009.

Amendment. Co-pending U.S. Appl. No. 11/554,940. Dated: Jun. 22, 2009.

United States Final Office Action. Co-pending U.S. Appl. No. 11/554,940. Dated: Sep. 9, 2009.

Canadian Office Action. Application No. 2,545,669. Dated: Sep. 28, 2009.

Amendment. Co-pending U.S. Appl. No. 11/554,940. Dated: Nov. 3, 2009.

Request for Continued Examination (RCE). Co-pending U.S. Appl. No. 11/554,940. Dated: Nov. 3, 2009.

United States Office Action. Co-pending U.S. Appl. No. 11/554,940. Dated: Jan. 12, 2010.

Office Action. Co-pending U.S. Appl. No. 11/554,940. Dated: Jan. 12, 2010.

Amendment. Co-pending U.S. Appl. No. 11/554,940. Dated: Apr. 12, 2010.

Office Action. Co-pending U.S. Appl. No. 11/554,940. Dated: Jul. 8, 2010.

Canadian First Office Action. Application No. 2,566,778. Dated: Mar. 31, 2010.

Amendment/Response. Co-pending U.S. Appl. No. 11/554,940. Dated: Mar. 24, 2011.

Notice of Allowance. Canadian Application No. 2,566,778. Dated: Nov. 5, 2010.

Decision to grant a European patent pursuant to 97(1) EPC. European Application No. 06112801.3. Dated: Nov. 12, 2009.

Notice of Allowance. Co-pending U.S. Appl. No. 11/554,940. Dated: Jun. 24, 2011.

Amendment after Allowance. Co-pending U.S. Appl. No. 11/554,940. Dated: Jul. 18, 2011.

Response to Rule 312 Communication. Co-pending U.S. Appl. No. 11/554,940. Dated: Aug. 3, 2011.

Co-pending U.S. Appl. No. 13/220,140, "System, Method, and User Interface for Searching for Messages With Attachments on a Mobile Device", filed Aug. 29, 2011.

Notice of Allowance. Co-pending U.S. Appl. No. 11/554,940. Dated: Jan. 24, 2011.

Amendment/Response. Co-pending U.S. Appl. No. 11/554,940. Dated: Nov. 8, 2010.

Office Action. Co-pending U.S. Appl. No. 11/554,940. Dated: Jan. 24, 2011.

Amendement/Response. Co-pending U.S. Appl. No. 11/554,940. Dated: Mar. 24, 2011.

Notice of Allowance. Canadian Application 2,545,669. Dated: Nov. 5, 2010.

* cited by examiner

SEARCHING FOR ELECTRONIC MAIL (EMAIL) MESSAGES WITH ATTACHMENTS AT A WIRELESS COMMUNICATION DEVICE

FIELD OF THE INVENTION

The present invention pertains to electronic mail, and more particularly to searching for electronic mail with attachments at a wireless communication device.

BACKGROUND OF THE INVENTION

Electronic systems that "push" (i.e. automatically transmit) electronic mail messages to wireless communication devices are well-known. In an exemplary system, an intermediary server monitors an inbox of an email account at an email server. When an email message arrives at the monitored inbox, the intermediary server "pushes" the email message to the wireless communication device by way of a data network (such as the public Internet) and a wireless network. If the email message has an attachment (i.e. a computer file that accompanies the email message such as a word processing file, image file or spreadsheet for example), the intermediary server may refrain from automatically pushing the attachment to the device, and may instead await a user request for the attachment from the wireless communication device before transmitting some or all of the attachment to the device.

When an email message having an attachment is pushed to the wireless communication device (without the attachment), the fact that the message has an associated attachment may be indicated to the user, e.g., by an icon displayed in association with the message. The appearance of the icon may indicate the nature of the attachment (word processing file, image file, spreadsheet, etc.). If the user opts to view the attachment, by selecting the icon for example, a request for a first portion of the attachment may be automatically generated and transmitted via the wireless network to the intermediary server. The attachment service at the intermediary server may reformat the attachment for display on a small device screen or paginate the attachment to support piecemeal downloading of portions ("chunks") of the attachment as the user pages down using the attachment viewer. The attachment service may then transmit the first "chunk" of the attachment to the device. A chunk may for example be a two kilobyte portion of the processed attachment. The chunk may be displayed by the attachment viewer along with a "more" menu item. Selection of the "more" menu item may cause a request for another chunk to be sent to the intermediary server.

At any given time, the wireless communication device may store in its local memory numerous email messages which have been "pushed" to the device. For email messages having at least one attachment, the attachment may be resident in memory at the wireless communication in whole, in part (e.g. in the form of one or more chunks), or not at all, depending upon whether or it has been transmitted to the device, responsive to the user's interactions with the attachment viewer.

It is known to search for email messages based on various search criteria including textual content in various email message fields, (such as body, subject and addressee fields). It would be desirable to extend search capabilities at wireless communication devices to email messages having email attachments.

BRIEF DESCRIPTION OF THE DRAWINGS

In the figures which illustrate an example embodiment of the invention.

DETAILED DESCRIPTION

Figure 1:
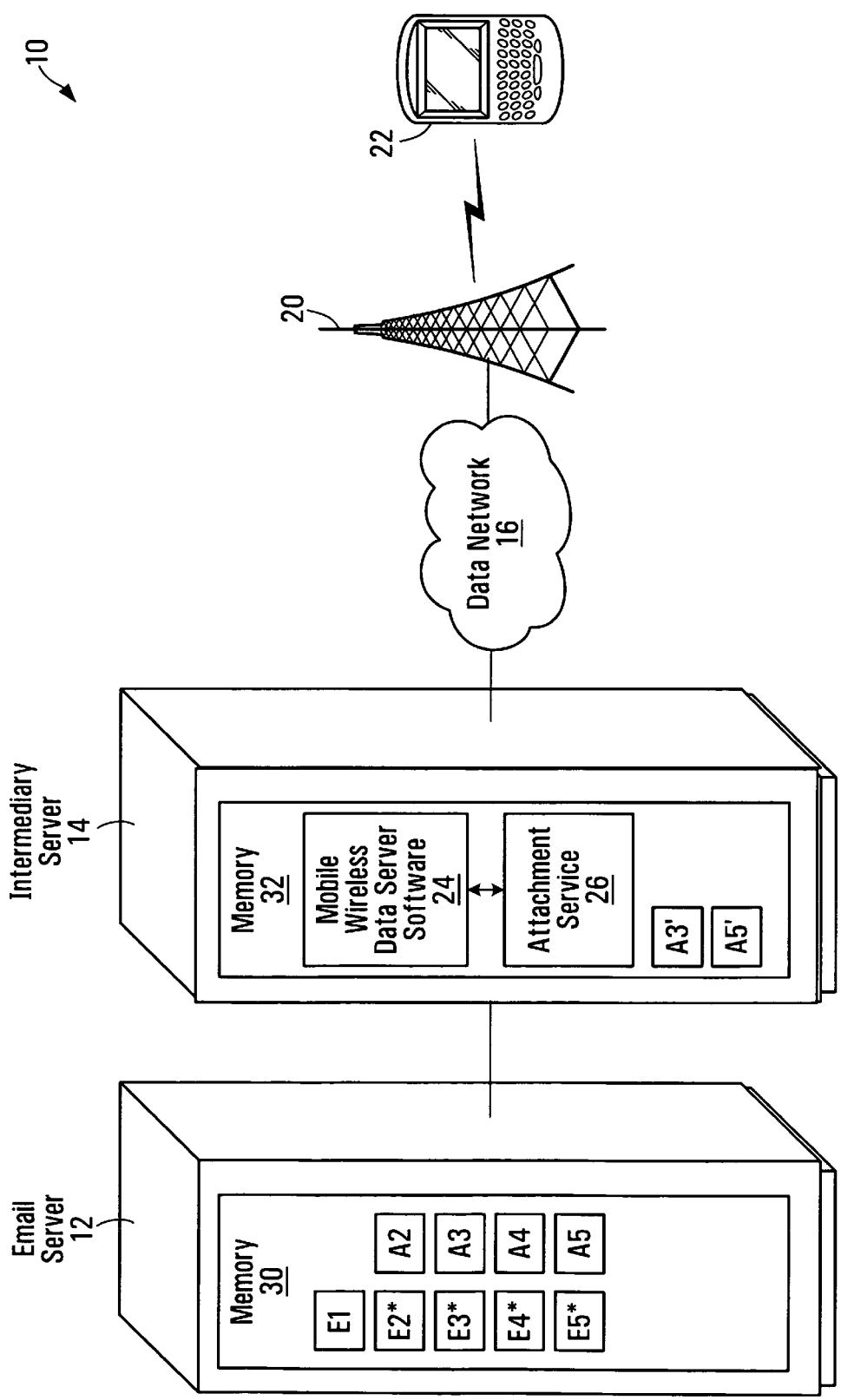
FIG. 1 is a schematic diagram illustrating a system that supports searching by email attachments at a wireless communication device.

In one aspect of the below-described embodiment, there is provided a method comprising: receiving a set of email messages at a wireless communication device, each of the email messages having at least one attachment; for each attachment of an email message of the set, maintaining an indicator of whether any content of the attachment has been presented at the wireless communication device; identifying a subset of the set of email messages on the basis of the indicators and a user-specified parameter; and displaying a representation of the identified subset of email messages at the wireless communication device.

In another aspect of the below-described embodiment, there is provided a method comprising: receiving a set of email messages at a wireless communication device, each of the email messages having at least one attachment; for each email message of the set, determining whether content of at least one attachment of the email message is presentable at the wireless communication device; based on the determining, identifying a subset of the set of email messages, each email message of the subset having at least one attachment whose content is presentable at the wireless communication device; and displaying a representation of the identified subset of email messages at the wireless communication device.

In yet another aspect of the below-described embodiment, there is provided a machine-readable medium containing code for execution at a wireless communication device, comprising: machine-executable code for receiving a set of email messages at the wireless communication device, each of the email messages having at least one attachment; machine-executable code for maintaining, for each attachment of an email message of the set, an indicator of whether any content of the attachment has been presented at the wireless communication device; machine-executable code for identifying a subset of the set of email messages on the basis of the indicators and a user-specified parameter; and machine-executable code for displaying a representation of the identified subset of email messages at the wireless communication device.

In yet another aspect of the below-described embodiment, there is provided a machine-readable medium containing code for execution at a wireless communication device, comprising: machine-executable code for receiving a set of email messages at the wireless communication device, each of the email messages having at least one attachment; machine-executable code for determining, for each email message of the set, whether content of at least one attachment of the email message is presentable at the wireless communication device; machine-executable code for identifying, based on the determining, a subset of the set of email messages, each email message of the subset having at least one attachment whose content is presentable at the wireless communication device;

and machine-executable code for displaying a representation of the identified subset of email messages at the wireless communication device.

FIG. 1 illustrates an exemplary system 10 that supports searching by email attachments at a wireless communication device. The system 10 is a modification of a conventional system that automatically transmits ("pushes") email messages to wireless communication devices. As illustrated, system 10 includes an email server 12, an intermediary server 14 having an attachment service 26, a data network 16, a wireless network 20 and a wireless communication device 22.

Email server 12 is a conventional server executing messaging and collaboration software such as Microsoft® Exchange Server, Lotus® Domino® Server or the like. Email server 12 may be designed to maintain multiple email accounts, each of which has an inbox for incoming email messages. The server 12 includes memory 30 in addition to other conventional components such as a processor (the other components being omitted from FIG. 1 for brevity). In FIG. 1, five exemplary email messages E1, E2, E3, E4 and E5 are illustrated in memory 30. These email messages have been received at an inbox of a single user's email account. In FIG. 1, email messages marked with an asterisk ("*") identify email messages having at least one attachment. Specifically, as shown in FIG. 1, email messages E2, E3, E4 and E5 each have a single attachment A2, A3, A4 and A5, respectively. In the present embodiment, attachment A2 is a zip archive, attachment A3 is a Microsoft® Word document attachment A4 is an MP3 music file and attachment A5 is a Adobe® PDF document. The email messages and attachments have been sent to the email server 12 in the Multipurpose Internet Mail Extensions (MIME) format.

Intermediary server 14 may be a server product sold by Research in Motion Limited. The intermediary server 14 executes two software applications which intercommunicate during operation: the mobile wireless data server software 24 and the Attachment Service 26.

The mobile wireless data server software 24 is a software application that is responsible for "pushing" email messages received at the inboxes of specified email accounts of email server 12 to the wireless communication device 22, in a conventional manner. The software 24 communicates with email server 12 for purposes of monitoring the specified email account inboxes. When a new email message is detected, the email message is automatically converted to a proprietary format known as Compressed Multipurpose Internet Mail Extensions (CMIME) and transmitted to the wireless communication device 22 as a stream of bytes, via data network 16 (possibly through a firewall, not expressly illustrated in FIG. 1). In addition, the software 24 receives email attachment requests from device 22 and intercommunicates with Attachment Service 26 for the purpose of obtaining the desired attachment (or a portion thereof, as discussed below) for transmission to the device 22, on an on-demand basis.

The Attachment Service 26 is a software application that processes email attachments in preparation for their possible transmission to and presentation at a wireless communication device such as device 22.

The Attachment Service 26 intercommunicates with the mobile wireless data server software 24 for the purpose of handling requests for email attachments, or portions thereof, from wireless communication devices such as device 22. A request for a portion of an attachment may be generated, e.g., when the user selects a "more" menu item within the attachment viewer to indicate a desire to display only a next portion of an attachment. When such a request is received, the Attachment Service 26 accesses the requested email attachment directly from the email server 12 and processes it. The result of this processing is a converted attachment that is optimized for wireless delivery to, and presentation by, wireless communication device 22. Conversion may involve breaking down the attachment in "chunks", as described in U.S. patent application Publication No. 2005/018636, which is hereby incorporated by reference hereinto. The converted attachment is stored in memory 32 at the server 14. Only attachments which have been specifically requested and whose format is recognized are automatically converted. For example, in the embodiment illustrated in FIG. 1, attachments A3 and A5 have recognized formats, and have been requested in whole or in part, thus they are converted and stored in memory 32 of intermediary server 14 as converted attachments A3' and A5', respectively (the "prime" symbol, "'" is used herein to denote converted attachments). Attachment A2, on the other hand, has not been requested (although its format is recognized) and has thus not been converted. Moreover, attachment A4 is not in a recognized format and has thus not been converted. Recognized attachment formats may for example include "electronic business card" attachments that are compatible with a personal information management (PIM) application at the wireless communication device 22, and other popular or standard formats, such as Microsoft® Word documents, Microsoft® Excel™ spreadsheets, Microsoft® PowerPoint™ presentations, Adobe® Portable Document Format (PDF) documents, HyperText Markup Language (HTML) files, various image file formats (e.g. .wmf, .emf, .gif, .jpeg, .bmp, .png), .wav files, Zip archive and American Standard Code for Information Interchange (ASCII) files. The set of attachment formats that are currently recognized may be based upon the currently available set of conversion mechanisms provided by the Attachment Service 26. An attachment having a recognized format is referred to as a "recognized attachment". The Attachment Service 26 communicates with mobile wireless data server software 24 for coordinating delivery of requested attachments or attachment portions to the wireless communication device 22 via data network 16 and wireless network 20.

Data network 16 is a conventional data network which is used to transmit email messages and requested email attachments towards wireless communication device 22. The network may deliver email messages and attachments to a network operation centre (not illustrated) for purposes of relaying to the wireless network 20. The data network 16 also transmits requests for email attachments in the opposite direction to the intermediary server 14. Data network 16 may be the public Internet or a privately managed and operated Internet Protocol (IP) network for example.

Wireless network 20 is a conventional wireless network which serves as the final link in the communication chain between the intermediary server 14 and the wireless communication device 22. Network 20 may for example be a mobile data communication network, such as a Mobitex™, DataTAC™ or General Packet Radio Service (GPRS) mobile data communication network, or a conventional voice communication network, such as Advanced Mobile Phone Service (AMPS), Time Division Multiple Access (TDMA), Code Division Multiple Access CDMA, Personal Communications Service (PCS) or Global System for Mobile Communications (GSM) for example. Other types of data and voice networks, separate and integrated, could alternatively be utilized for network 20.

Wireless communication device 22 is a two-way radio frequency (RF) communication device having data communication capabilities, such as a handheld device sold by Research In Motion Ltd., which has been modified from a conventional configuration in order to support search by email attachments, as described below. Wireless communication device 22 is illustrated in greater detail in FIG. 2.

Figure 2:
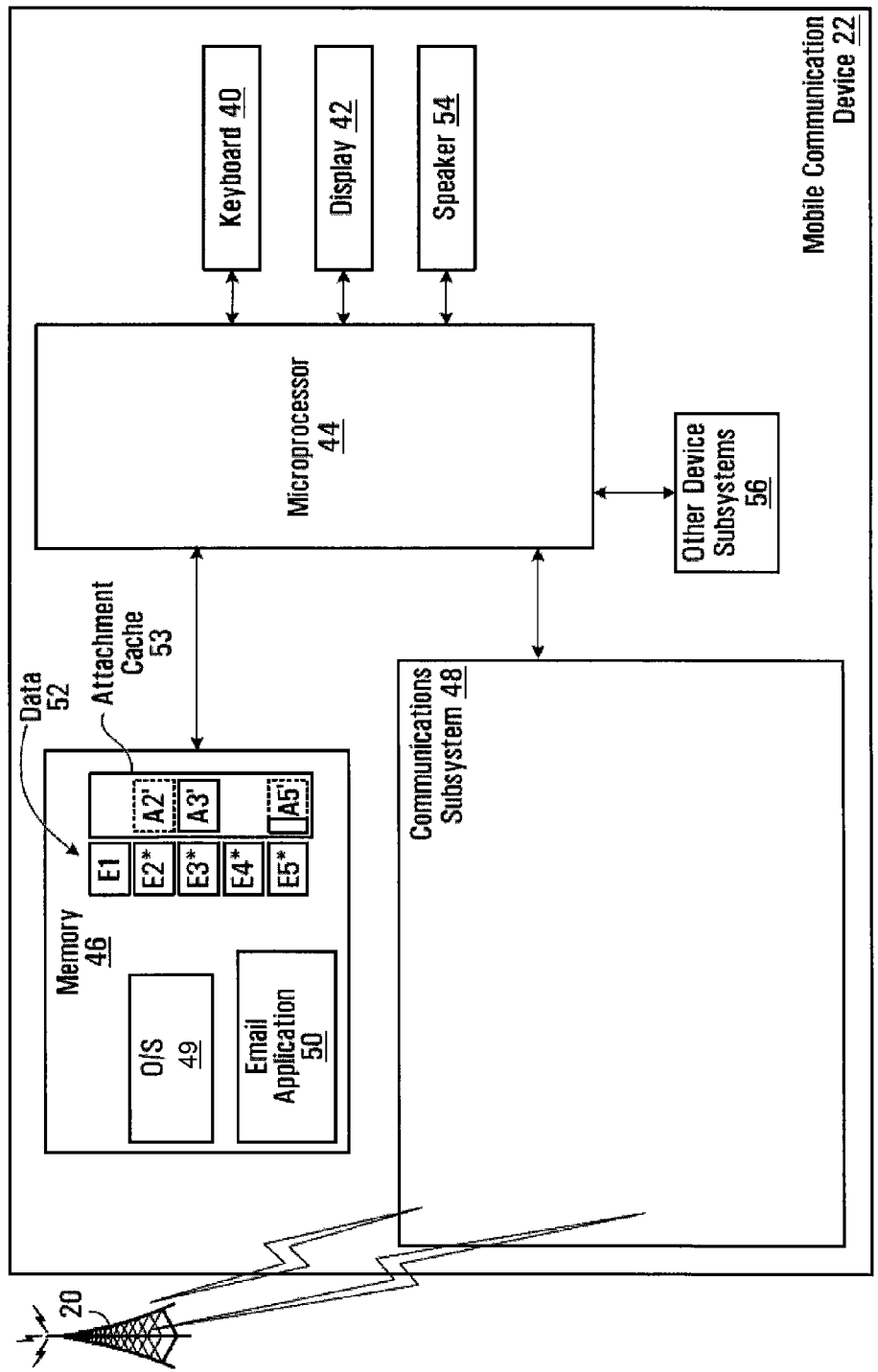
FIG. 2 illustrates a wireless communication device component of FIG. 1 which is exemplary of an embodiment of the invention.

Referring to FIG. 2, wireless communication device 22 includes a keyboard 40, a display 42, a microprocessor 44, memory 46 and a communications subsystem 48. These components are communicatively coupled as illustrated in FIG. 2.

Keyboard 40 is a user input device which permits a user of the wireless communication device 22 to enter text for such purposes as composing and sending email messages or specifying criteria for searching locally stored email messages for example.

Display 42 is an output device that is capable of presenting a graphical user interface (GUI) to a user. The display 42 may be a full graphic Liquid Crystal Display (LCD) for example. The display 42 is used to display email messages and email message attachments to the user. The dimensions of display 42 may be limited due to the limited overall size of the device 22.

Microprocessor 44 is a conventional processor which controls the overall operation of the wireless communication device 22 based on user actuation of keys on the keyboard 40 and the receipt of data from wireless network 20. The microprocessor 44 executes operating system software and application software that is stored in local memory 46. Microprocessor 44 is communicatively coupled (either directly or indirectly) to the keyboard 40, display 42, memory 46 and communication subsystem 48, as illustrated in FIG. 2.

Memory 46 stores various software and data used at the device 22, including operating system software 49, email application 50 and data 52. Memory 46 may consist of flash memory, random access memory (RAM), read only memory (ROM), or a combination of these for example. Typically, at least some of memory 46 will be persistent. It will be appreciated that memory 46 is a form of machine-readable medium.

Operating system software 49 is software which governs the basic operation of wireless communication device 22.

Email application 50 is a software application that is capable of managing and displaying email messages and email message attachments at device 22. The email application 50 incorporates an attachment viewer component which facilitates the viewing of recognized attachments. The application 50 is modified from a conventional email application to support searching by email attachments at device 22, as will be described. The application 50 may be one of many application software modules resident in memory 46 (not expressly illustrated). The application 50 includes machine-executable code.

Data 52 is data that is generated or used by email application 50 at device 22. In the illustrated embodiment, data 52 includes five email message objects. These objects corresponding to email messages E1, E2, E3, E4 and E5 of FIG. 1 and are thus labelled with the same reference characters. Each of the email messages objects of FIG. 2 is an instance of a Java object-oriented class representing an email message of like name that has been "pushed" to the device by the intermediary server 14. Each email message object is instantiated at the device upon the receipt of a CMIME byte stream representing that message from the intermediary server 14. Email messages marked with an asterisk (i.e. messages E2, E3, E4 and E5) in FIG. 2 have at least one associated attachment. As previously noted, the email attachments are not "pushed" to the device 22, but rather are selectively provided to the device 22 by intermediary server 14 based upon user-initiated requests from the device 22. When attachments are provided to the device 22, in response to such requests, they are provided in chunks, as will be described. Depending on the user's actions, an attachment may be resident in memory 46 in whole, in part, or not at all. In FIG. 2, the illustration of an attachment or a portion of an attachment with a solid line border indicates its presence in memory 46. In contrast, the illustration of an attachment or a portion of an attachment with a dashed line border indicates its absence from memory 46. From this notation, it will be apparent that attachment A2' is absent from memory 46; attachment A3' is wholly resident in memory; and attachment A5' is only partly resident in memory 46 (e.g. only one chunk of the attachment is resident in memory 46). The attachments reside in an attachment cache 53. Within the cache, each attachment is wrapped in a Java object that facilitates presentation of the attachment (i.e. presenting the attachment's content) at device 22.

It is noted that attachment A4 (FIG. 1) is not shown in memory 46 of FIG. 2 in solid lines or in dashed lines. This is due to the fact that the format of attachment A4 is unrecognized by the Attachment Service 26. The attachment is therefore incapable of being downloaded to the device 22 in the present embodiment.

Communication subsystem 48 is responsible for effecting data communications (and possibly voice communications) between the device 22 and rest of system 10 via wireless network 20. Subsystem 48 may include such components as a receiver, a transmitter, one or more antennas, and a digital signal processor (none of which are expressly illustrated). The specific design and implementation of the communication subsystem 48 is dependent upon the communication network 20 in which the mobile device 22 is intended to operate.

The wireless communication device 22 also includes a speaker 54 and may further include various other device subsystems 56.

Figure 3:
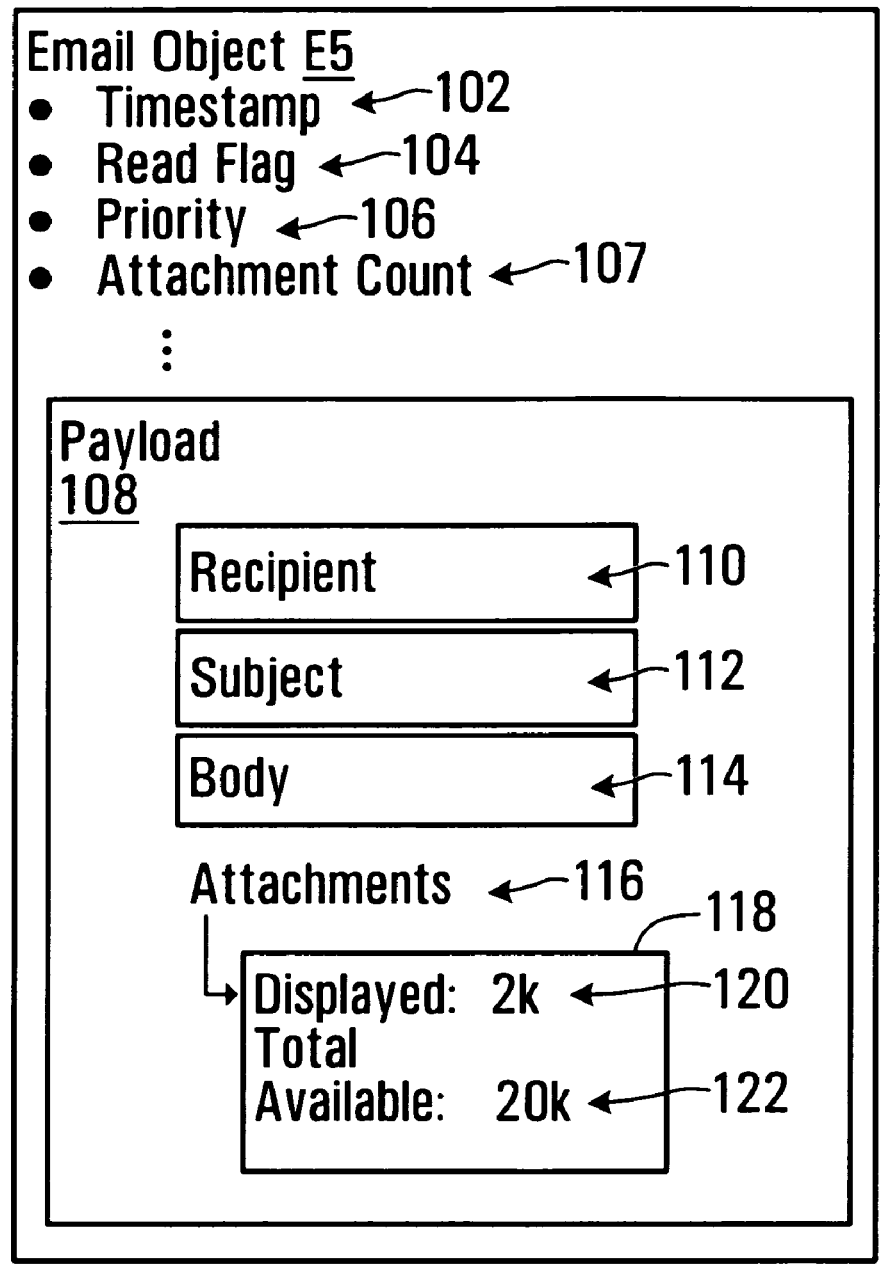
FIG. 3 illustrates an instance of an object-oriented class that is instantiated in the memory of the wireless communication device of FIG. 2 to represent an email message.

FIG. 3 illustrates exemplary email object E5 of FIG. 2 in a greater detail. Each of email messages E1, E2, E3, and E4 will have similar structure, with some differences that will be described.

As shown in FIG. 3, email object E5 in an instance of an object-oriented Java class having various attributes, such as a timestamp (time of arrival) attribute 102, a read flag attribute 104 indicating whether or not the email message has been read, a priority attribute 106 indicating email message priority, and an attachment count 107 indicating the number of attachments of the represented email message. Other attributes may be present but have been omitted from FIG. 3 for brevity. The object E5 also contains a subordinate payload object 108. Payload object 108 is a container object containing various subordinate objects representing various other components of email message E5. The subordinate objects include a message recipient object 110, a message subject object 112, a message body object 114 and a set of attachment objects 116.

Attachment objects 116 represent the attachments of email message E5. The number of attachment objects 116 corresponds to the number of attachments in the email message, as indicated by the attachment count attribute 107. If the email message has no attachments, there will be no objects 116. In FIG. 3, a single attachment object 118 is illustrated, reflecting the fact that email message E5 has a single attachment. The attachment object 118 has various attributes. A first attribute 120 indicates how much of the attachment has been displayed at the device 22 using the attachment viewer. In the present embodiment, a chunk is a 2 kilobyte (2 KB) portion of the attachment. A second attribute 122 indicates the total size of the attachment at the intermediary server 14 (FIG. 1). In FIG. 3, the values of the first and second attributes cumulatively indicate that only the first chunk of the attachment of email message E5 has been viewed and that nine more as-yet undisplayed chunks (i.e. 18 KB) remain at the server 14.

In the present embodiment, each attachment object of objects 116 implements one of two Java interfaces. If the represented attachment is in a format recognized by the Attachment Service 26, then the attachment object will implement a first Java interface referred to as the "recognized attachment interface". Otherwise, the attachment object will implement a second Java interface which is referred to as the "unrecognized attachment interface". In the former case, the recognized attachment interface effects a "content proxy" which acts as a pointer into the attachment cache 53 in which wrapped attachment content is stored. This arrangement separates representations of attachment content from representations of email objects, so that attachments may be "cleaned up" or purged independently of email messages. The determination of whether an attachment is in a recognized format is made on the basis of attachment information embedded within the CMIME byte stream that is transmitted to device 22 when the email message is "pushed" to the device. The implementation of different Java interfaces on the basis of whether or not the attachment format is recognized facilitates run-time searching for email messages having attachments. In particular, the identity of the implemented interface will indicate whether the email message should or should not be displayed in a list of email messages having attachments, as will be described.

Figure 4:
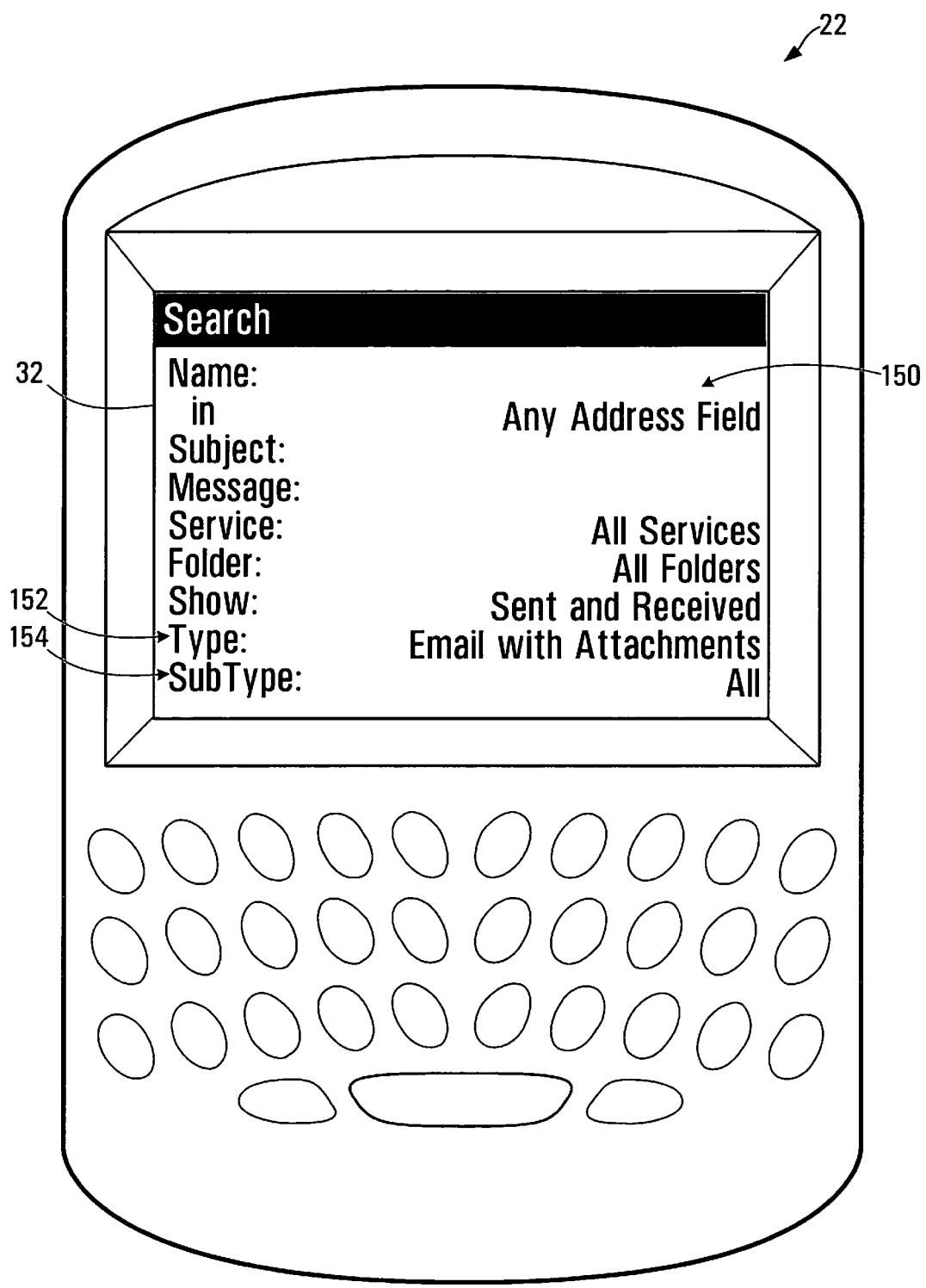
FIGS. 4 and 5 illustrate a graphical user interface screen displayed on the display of the wireless communication device of FIG. 2.

Referring to FIG. 4, a graphical user interface (GUI) screen 150 displayed on the display 42 of wireless communication device 22 is illustrated. The GUI screen 150 is presented by the email application 50 (FIG. 2) upon the entry of user commands at device 22 indicating a desire to search email messages (or other types of messages) stored at device 22 based on user-specified search parameters. The user may interact with GUI screen 150 to specify parameters for the search. As illustrated, search parameters that may be specified by a user of device 22 may include: text to be matched within a specified address field (such as the To:, From:, CC: or BCC: field of an email message for example), subject line, or message body; a service (e.g. an email account provider) by which the message was received; the identity of containing folders within the specified service(s); and whether incoming messages, outgoing messages, or both should be searched. Search parameters also include a type parameter 152 and a subtype parameter 154.

Type parameter 152 allows the user to limit the search to only certain types of messages. This parameter may be set to specify such message categories as email messages or Short Message Service (SMS) messages, for example, or to specify a subcategory within one of those categories. In FIG. 4, the parameter 152 has been set to "email with attachments". This is a subcategory within the category "email messages" and indicates that only email messages with at least one recognized attachment should be returned by the search.

Subtype search parameter 154 is only specified when the type search parameter 152 has been set to "email with attachments" and permits the search to be further narrowed as described below. To facilitate the setting of this parameter, a pop-up window 160 as shown in FIG. 5 is displayed.

Figure 5:
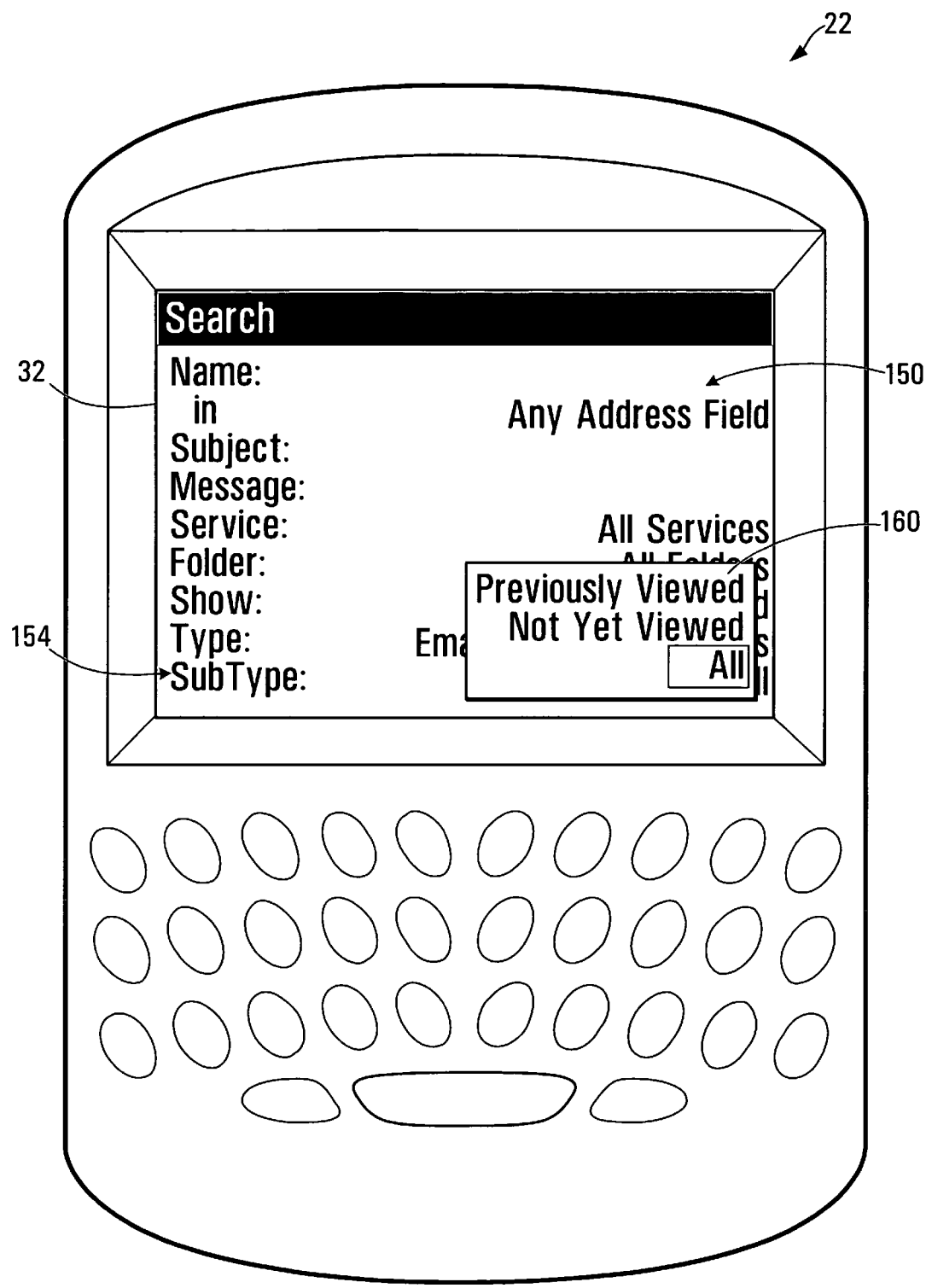

Referring to FIG. 5, pop-up window 160 for setting the subtype search parameter 154 lists three mutually exclusive options. The first option, "Previously Viewed", may be selected in order to indicate that only email messages having at least one attachment whose content has been at least partially presented at the device 22 should be returned. A determination that an attachment as content has been at least partially presented at the device 22 is based an indicator maintained at the device 22 for each attachment which indicates whether the attachment as content has been at least partially displayed on display 42 or at least partially played on speaker 54. In the present embodiment, the presence of at least one chunk of the attachment within attachment cache 53 (FIG. 2) serves as this indicator. Alternatively, the "Displayed" attribute 120 of each attachment object associated with an email message object may serve as the indicator; if any attribute 120 has a value greater than zero, that attribute's content will have been at least partially presented. Alternative embodiments may use other forms of indicators, such as flags which are set when an attachment as content is at least partially presented.

The second option, "Not Yet Viewed", is the converse of the "Previously Viewed" option. This option indicates that only email messages whose attachment(s) has/have not been previously presented in whole or in part at the device 22 should result in matches. A determination that none of an email message's attachments has been previously presented is also made on the basis of the indicator described above.

The third option, "All", indicates that all email messages having at least one attachment should be returned, regardless of whether the attachment(s) has/have been presented in whole or in part.

It is noted that, in the present embodiment, only attachments whose formats are recognized are considered to be "presentable" (i.e. to have presentable content) at the device 22. Only "presentable" attachment can result in matches when search parameter 152 has been set to "email with attachments", regardless of the option selected for search parameter 154. Alternative embodiments may permit any email message having at least one attachment to result in a match, regardless of whether the attachment is "presentable".

It is also further noted that the search parameters of screen 150 are cumulative. Thus, if search parameters other than parameters 152 and 154 are specified, they would also need to be met in order for a match to occur.

In operation, the arrival of email messages E1-E5 at email server 12 is detected by the intermediary server 14 (FIG. 1). The intermediary server 14 processes each of the email message, generating a CMIME byte stream for each email message on the basis of the received message content. For each email message having one or more attachments, the generated CMIME byte stream includes a single "header" for each attachment. For each attachment having a format that is recognized by the Attachment Service 26 (e.g. attachments A2, A3 and A5 of FIG. 1), the header will indicate that the format is recognized and will specify certain attachment parameters such as the name of the attachment, its size and its content type. For each attachment having an unrecognized format (such as the attachment associated with email message E4), the associated header will indicate the fact that the format is unrecognized and will indicate only the name of the attachment. For each email message that lacks any attachments (such as email message E1), the corresponding byte stream will lack any such header. The byte streams are transmitted to the wireless communication device 22 conventionally by the intermediary server 14 according to the "push" procedure.

At the wireless communication device 22, the byte stream associated with each email message E1-E5 is received by the communications subsystem 48 and is relayed to the email application 50 in a conventional manner. The email application 50 processes each byte stream and instantiates a corresponding email object, similar to email object E5 of FIG. 3, on the basis thereof, for each byte stream. If the byte stream lacks any headers (e.g. as for email message E1), the instantiated email object will not have any subordinate attachment objects 116 (FIG. 3). If the byte stream includes a header representing a recognized attachment (e.g. as for email messages E2, E3 and E5), the header is "wrapped" in an object that implements the recognized attachment interface resulting in a subordinate attachment object 118 representative of that recognized attachment. If the byte stream includes a header representing an unrecognized attachment (e.g. as for email message E4), the header is "wrapped" in an object that implements the unrecognized attachment interface, resulting in a subordinate attachment object representative of that attachment.

At this stage, a user of device 22 may enter commands to cause email application 50 to display a representation (e.g. a list) of messages stored locally at the device, including email messages and possibly other types of messages (e.g. SMS messages). Each email message E1-E5 in the list may be represented as an entry in the list. Each entry may include an icon (such as an envelope icon) along with a time of receipt of the message, a sender ID, and a subject. For each of email messages in the set of email messages E2-E5, a further visually distinguishing characteristic, such as an associated attachment icon, may indicate that the message has at least one attachment.

The user may enter appropriate commands at the device 22 to indicate a desire to view a first chunk of the attachment associated with email message E5 (i.e. attachment A5, or more specifically, converted attachment A5') using the attachment viewer. This results in the automatic generation of a request for the first 2 KB chunk of the attachment, which request is transmitted via the wireless network 20 and data network 16 to the intermediary server 14. The Attachment Service 26 may respond by engaging in processing to convert the attachment into chunks, e.g. of 2 kilobytes, that are suitable for presentation at the device 22, (as previously described), and transmitting the first 2 KB chunk of the converted attachment A5' to the device 22. This chunk is stored in attachment cache 53 (FIG. 2), after being wrapped in a Java object that facilitates presentation of the attachment content at the device 22. The content proxy object of the relevant object that implements the recognized attachment interface is configured to point to the "wrapped" chunk. The chunk may then be displayed by the attachment viewer along with a "more" menu item for requesting additional chunks. If more chunks were requested, they would be added to the existing content in the "wrapper" Java object in the attachment cache 53. In this example, it is assumed that the user does not select the more menu item, but rather navigates back to the message list after viewing the first chunk.

The user now may further enter appropriate commands at the device 22 to indicate a desire to view all chunks of the attachment associated with email message E3 (i.e. attachment A3). In particular, the user may interact with the device 22 to cause each chunk of the attachment A3' to be downloaded. Alternatively, the attachment may have a format (content type) which requires the attachment to be downloaded as a whole, e.g. because the entirety of the content is required in order to present the attachment content at the device 22 (e.g. certain image or audio files). The Attachment Service 26 may respond by transmitting each chunk in turn or the attachment as a whole to the device 22 for display in the attachment viewer. The downloaded attachment content is "wrapped" and stored in attachment cache 53, as described above.

At some later point in time, the user of wireless communication device 22 may wish to search for email messages having at least one attachment whose content which has been at least partially presented at the device. The rationale for such a search may be a desire to identify candidate email messages for deletion in order to free device memory 46. The user enters suitable commands at device 22 to cause email application 50 to present GUI screen 150 as shown in FIG. 4. The user sets the type parameter 152 to "email with attachments" and the subtype parameter 154 to "previously viewed". No other search parameters are specified in this example (although additional search parameters could be specified if desired).

When the search is triggered, each of email objects E1-E5 is examined in turn to identify a subset of email messages matching the user-specified search parameters. For each email object having at least one subordinate attachment object within the set of attachment objects 116 that is recognized (i.e. that implements the recognized attachment interface) and having an associated indicator indicating that the attachment content has been at least partially presented at the device 22, the represented email message is considered to be a match. Accordingly, the search results, which are a representation of the subset such as a list, will include an entry for each such message. In the present example, email messages E3 and E5 would be represented, since at least a portion of at least one attachment of these messages has been presented. In contrast, email message E2 would not be represented, since the user has not viewed any portion of the attachment for that email message. Email message E4 would also not be represented in the search results because its attachment has an unrecognized format.

The user may later wish to search for email messages having at least one attachment but having no attachment whose content has been presented in whole or in part. The rationale behind such a search may be a desire to identify as-yet unread email correspondence. In this case, the user sets the type parameter 152 to "email with attachments" and changes the subtype parameter 154 to indicate "not yet viewed". When the search is triggered, each of email objects E1-E5 in memory 46 is again examined to identify a subset of email messages matching the user-specified search parameters. For each email object having one or more subordinate attachment objects within the set of attachment objects 116 that implement the recognized attachment interface, the represented email message is considered to be a match and thus a member of the subset. In the present example, only email message E2 would be represented in the generated search results, since it is the only one whose attachment has not yet been viewed in whole or in part. Email message E4 is again not represented in the search results because its attachment has an unrecognized format.

If the user returns to the GUI screen 150 and changes the subtype parameter 154 to indicate "all" without changing any other search parameters, the search results would list each email message at device 22 having at least one attachment whose format is recognized, regardless of whether the attachment content has been viewed. These search results are a union of the email messages returned by the first search and the email messages returned by the second search. In the present embodiment, email messages E2, E3, and E5 would be represented in the resulting search results.

It is noted that, due to limited memory at the device 22 of some embodiments, the processor 34, under control of operating system 49, may periodically engage in memory management processing to purge memory 46 as it nears its full capacity. In this case, previously viewed attachment chunks within attachment cache 53 may be purged from memory 46. Following such purging, the attachment may still be considered to have been previously viewed however, despite the absence of any chunks in attachment cache 53. To facilitate such operation, the attribute 120 for each attachment may be utilized. Alternatively, a flag may be set for each email message in such embodiments to indicate whether any attachment has been at least partially presented, regardless of the presence or absence of attachment chunks in memory 46.

As will be appreciated by those skilled in the art, modifications to the above-described embodiment can be made without departing from the essence of the invention. For example, in some embodiments, attachments may be automatically converted into a form that is optimized for wireless delivery to, and presentation by, wireless communication device 22 immediately following their arrival at email server 12, rather than upon receipt of a request from the device 22 for at least a chunk of the attachment.

In another embodiment, the search may only return email messages having at least one attachment for which at least one chunk of the attachment resides in attachment cache 53. This type of search would not include email messages which have been at least partially presented but whose chunk(s) have been purged from memory.

In the above-descried embodiment, a chunk is a 2 kilobyte (2 KB) portion of the attachment. It will be appreciated that alternative embodiments may employ chunks of other sizes (e.g., 4K, 10K, 50K, 1 MB, etc.)

Other modifications will be apparent to those skilled in the art and, therefore, the invention is defined in the claims.

What is claimed is:

1. A method comprising:
   receiving a set of email messages at a wireless communication device, each of said email messages having at least one chunk of an attachment of the email message provided to the wireless communication device in response to user-initiated requests from the wireless communication device;
   for each email message of said set received at the wireless communication device, maintaining an indicator of whether at least one chunk of said attachment of the email message has been displayed on a display or played on a speaker at said wireless communication device;
   identifying a subset of said set of email messages on the basis of said indicator for the attachment of each email message of said set received at the wireless communication device and at least one user-specified parameter, wherein each of the at least one user-specified parameter can be set to a value so that email messages having an attachment for which at least one chunk has been displayed on a display or played on a speaker at the wireless communication device are identified based on said indicator for the attachment of each email message of said set received at the wireless communication device;
   wherein for each email message of said set received at the wireless communication device, the presence of at least one chunk of the attachment of the email message within an attachment cache serves as said indicator for the attachment; and
   displaying a representation of said identified subset of email messages at said wireless communication device.

2. The method of claim 1, further comprising displaying a user interface at said wireless communication device for specifying said at least one user-specified parameter.

3. The method of claim 1, wherein each email message identified at said identifying has at least one attachment having content that is displayable or playable at said wireless communication device.

4. The method of claim 3, further comprising instantiating an object-oriented class which implements a first object-oriented interface to represent each attachment whose content is displayable or playable at said wireless communication device.

5. The method of claim 4, further comprising instantiating an object-oriented class which implements a second object-oriented interface to represent each attachment whose content is not displayable or playable at said wireless communication device.

6. The method of claim 5, wherein said first object-oriented interface and said second object-oriented interface are both defined using the Java programming language.

7. A non-transitory machine-readable storage medium storing code for execution at a wireless communication device for implementing acts of a method, the method comprising:
   receiving a set of email messages at said wireless communication device, each of said email messages having at least one chunk of an attachment of the email message provided to said wireless communication device in response to user-initiated requests from said wireless communication device;
   for each email message of said set received at the wireless communication device, maintaining an indicator of whether at least one chunk of said attachment of the email message has been displayed on a display or played on a speaker at said wireless communication device;
   identifying a subset of said set of email messages on the basis of said indicator for the attachment of each email message of said set received at the wireless communication device and at least one user-specified parameter, wherein each of the at least one user-specified parameter can be set to a value so that email messages having an attachment for which at least one chunk has been displayed on a display or played on a speaker at the wireless communication device are identified based on said indicator for the attachment of each email message of said set received at the wireless communication device;
   wherein for each email message of said set received at the wireless communication device, the presence of at least one chunk of the attachment of the email message within an attachment cache serves as said indicator for the attachment; and
   displaying a representation of said identified subset of email messages at said wireless communication device.

8. A wireless communication device comprising a processor and a memory, the processor configured to perform acts of a method comprising:
   receiving a set of email messages at a wireless communication device, each of said email messages having at least one chunk of an attachment of the email message provided to the wireless communication device in response to user-initiated requests from the wireless communication device;
   for each email message of said set received at the wireless communication device, maintaining an indicator of whether at least one chunk of said attachment of the email message has been displayed on a display or played on a speaker at said wireless communication device;
   identifying a subset of said set of email messages on the basis of said indicator for the attachment of each email message of said set received at the wireless communication device and at least one user-specified parameter, wherein each of the at least one user-specified parameter can be set to a value so that email messages having an attachment for which at least one chunk has been displayed on a display or played on a speaker at the wireless communication device are identified based on said indicator for the attachment of each email message of said set received at the wireless communication device;
   wherein for each email message of said set received at the wireless communication device, the presence of at least one chunk of the attachment of the email message within an attachment cache serves as said indicator for the attachment; and
   displaying a representation of said identified subset of email messages at said wireless communication device.

* * * * *